United States Patent
Tsuetaki

[15] 3,684,357
[45] Aug. 15, 1972

[54] FUSED BIFOCAL CONTACT LENS UNIT

[72] Inventor: George F. Tsuetaki, 445 Wellington, Chicago, Ill. 60657

[22] Filed: Jan. 19, 1970

[21] Appl. No.: 3,683

[52] U.S. Cl. .....................351/161, 351/177, 264/1
[51] Int. Cl.............................G02c 7/04, G02c 7/06
[58] Field of Search...........................351/161, 177

[56] References Cited

UNITED STATES PATENTS

| | | | |
|---|---|---|---|
| 3,270,099 | 8/1966 | Camp | 351/161 X |
| 3,440,306 | 4/1969 | Neefe | 351/161 X |
| 3,472,581 | 10/1969 | Bronstein | 351/161 |

FOREIGN PATENTS OR APPLICATIONS

| | | | |
|---|---|---|---|
| 910,455 | 11/1962 | Great Britain | 351/161 |

OTHER PUBLICATIONS

Mandell, Article in Optometric Weekly June 1, 1967 pgs. 19–21

Dean, Article in Journal of the Texas Optometric Association Feb. 1969 2 pg.

Ruben, Article in British Journal of Opththalmology Vol. 50 1966 pgs 642–645

*Primary Examiner*—David H. Rubin
*Attorney*—James T. Fitzgibbon

[57] ABSTRACT

A fused bifocal contact lens having "no jump" characteristics at all points of the segment line separating the distant vision segment of zone from the near vision zone. The lens include conventional convex and concave surfaces on the exterior portions, but, by reason of the construction of the bifocal segment, the wearer does not experience double vision when his line of sight crosses the segment line and the wearer does not notice the presence of the bifocal segment when not looking therethrough. In one form, a full, concentric bifocal segment is provided, and in another form, a lens is provided in which the bifocal segment is of a bi-curve form, lies principally in the lower portion of the lens and is defined by an upper, outer curve and an inner curve forming a partially circular segment line across which there is no jump. Methods of forming such lenses, including the method of forming the near vision segment, forming a composite blank including both distant and near vision segments, and forming a bifocal lens from the composite blank, are described.

7 Claims, 9 Drawing Figures

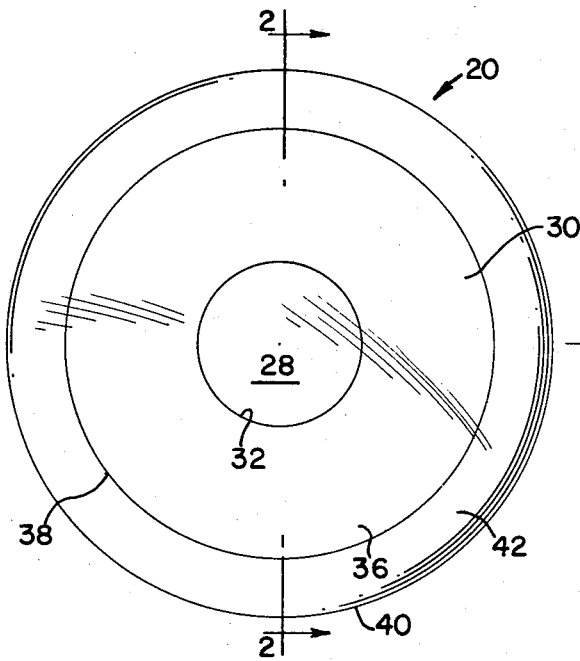
Fig. 1
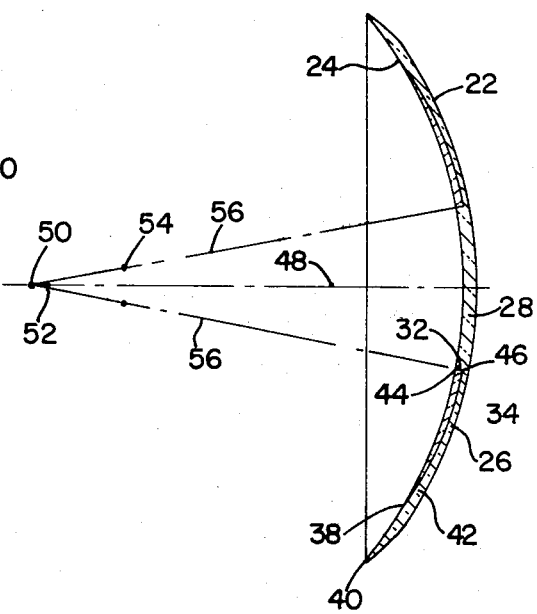
Fig. 2
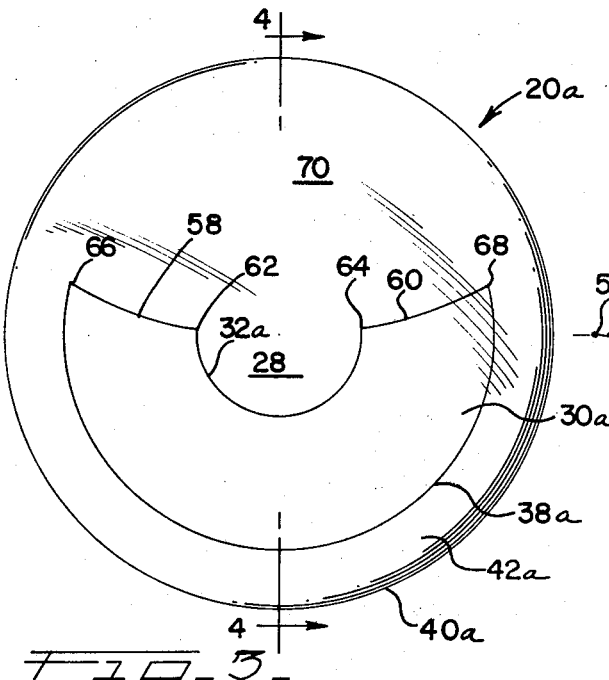
Fig. 3
Fig. 4
INVENTOR
GEORGE F. TSUETAKI
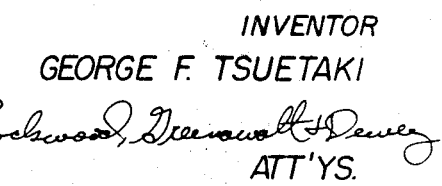
ATT'YS.

INVENTOR
GEORGE F. TSUETAKI
ATT'YS.

FUSED BIFOCAL CONTACT LENS UNIT

BACKGROUND OF THE INVENTION

The present invention relates to bifocal contact lenses and particularly those of a fused construction, that is, lenses of the type in which the bifocal segment is formed as an insert in the lens by being cast in place and joined to the remainder of the lens without the aid of the adhesives. Other types of bifocal contact lens are known, particularly those in which, for example, the front surface has a secondary or compound curve, that is, a different curvature at one part of the front surface than at another part. Lenses of this type do not form a part of the present invention, it being well recognized in the art that fused bifocal lenses are different in many ways from other, non-fused types of lenses.

With the advent of small diameter corneal contact lenses, greatly increased use of contact lenses has occurred. It is estimated that at least 5,000,000 and perhaps more pairs of contact lenses are now in use in the United States alone. Up until the present time, the majority of contact lenses have been single vision types, although bifocal contact lenses in various forms are known in themselves. One problem has existed, however, which has been a drawback to heretofore known types of bifocal contact lenses, and this problem is referred to in the art as "jump". The expression "jump" refers to the phenomenon which takes place when the line of sight crosses the segment line, that is, the boundary between the far vision and the near vision segments of the lens, and in particular, the part of the boundary defining the inner edge of the bifocal segment. As a result of such "jump", the wearer of bifocal contact lenses has had a somewhat annoying or unpleasant sensation when shifting his line of sight from one segment to the other.

As a result of this known drawback, there have been a number of efforts to solve this problem. So far, the efforts expended in this field have been known to succeed in providing a lens in which jump was eliminated at only one point on the segment line, commonly the point thereof lying at or just beneath the center of vision line of the eye, assuming the lens to be centered with respect to the eye and in its desired position of use. However, in these constructions, the phenomenon of jump still occurs whenever the line of sight crosses the segment line at any point other than the single point in question. Accordingly, in any task in which eye movement is predominantly from left to right, such as a typing job wherein a typist views material to be typed in a series of right-to-left eye movements, the phenomenon of jump is very annoying and tiring to the eyes. In addition, in a concentric bifocal lens, so-called because the bifocal segment is a continuous ring of toroid extending around the far or distant vision segment, a scattering or halo effect resulting from segment line jump is commonly observed upon viewing lights at night, such as when driving an automobile. No systems have been known to have been produced, or even proposed on a theoretical basis, in which the jump could be eliminated entirely around the segment line. Accordingly, there is a significant need for such a lens.

Another disadvantage of other known types of bifocal contact lenses is that the material comprising the far vision segment has in some cases been formed from a higher index of refraction material, which is notoriously unstable dimensionally. Lenses of this type have also been difficult to produce and are therefore undesirable from a manufacturing standpoint.

For the foregoing reasons, and for other reasons, and because of the shortcomings of certain prior art constructions in fulfilling the desired characteristics of a said bifocal contact lens, it is an object of the present invention to provide an improved bifocal contact lens characterized by a lack of jump throughout the entire extent of the segment line or surface defining the inner portion of the bifocal segment of the contact lens.

Another object is to provide an improved method for forming such lenses.

A still further object is the provision of a contact lens of the fully no jump type in which the bifocal segment totally surrounds the central, distant vision segment.

Another object is the provision of a bifocal contact lens having a bifocal segment extending only partially around the far vision segment, and in which there is no jump across the entire extent of the inner portion of the segment line or surface.

Another object is the provision of an improved bifocal contact lens which is of particular advantage to users whose occupations call for frequent lateral eye movement into and out of the near vision or bifocal segment of the lens.

A further object is the provision of a lens which is dimensionally stable by reasons of its construction.

A still further object is the provision of a method for making such lenses in which full advantage may be taken of existing materials to provide lenses of characteristics not heretofore able to have been achieved as a practical matter.

Another object is the provision of a bifocal contact lens in which the center of curvature of the front face of the bifocal segment lies on a line extending from the center of curvature of the lens rear or base curve to the segment surface or line separating the distant vision portion centrally located in the lens from the near vision segment of the lens which is disposed radially outwardly of the distant vision segment.

A still further object is the provision of a method of forming a contact lens wherein a cylindrical blank is rotated about a given center line and a front curve imparted thereto by moving a tool in an arc about a point radially offset from said center line, in which an opening is then cut in the center of the resulting blank of a size desired to provide a distant vision segment, in which a mass of fluid material for forming the remainder of the lens is cast in place covering at least a portion of said blank, including the front surface portion and the opening therein to form a composite blank, and in which the resulting composite blank is cut to form a contact lens such that rear base curve thereof comprises portions of both near and far vision segments in which the front surface comprises entirely material from which the far vision portion is made.

A further object is the provision of a method for forming a no jump bifocal contact lens blank which includes forming a near vision blank according to a predetermined pattern, and covering a portion of the near vision blank with material comprising a distant vision forming element, so that a lens having predetermined characteristics not heretofore attainable may be cut from the resulting composite blank.

A still further object is the provision of a no jump bifocal contact lens having single radius front and rear curves.

Another object is the provision of a fused bifocal contact lens having the major or far vision portion thereof made from a lower index of refraction material than the material comprising the bifocal segment.

A still further object is the provision of a bifocal contact lens which may, by reason of the manner in which curves defining the bifocal segment are formed, include a bifocal segment portion of greatly reduced thickness, thereby resulting in a lens having a greater proportion of low refractive index material and greater dimensional stability.

A still further object is the provision of a no jump bifocal contact lens having a bi-curve or similar surface defining a portion of the bifocal segment of the lens.

Another object is the provision of a method which is equally suitable for making no jump concentric bifocal lenses and no jump bifocal lenses having bifocal segments in the form of only a portion of a ring, and defined in part by surfaces having at least two characteristics, different forms.

A still further object is the provision of an improved method of making no jump bifocal contact lenses as well as composite blanks from which such lenses may be made.

The present invention accomplishes these objects, and others inherent therein, by providing a bifocal contact lens in which the center of curvature of the front surface of the bifocal segment lies on a line extending from the center of curvature of the base curve of the lens to that portion of the segment surface separating the distant vision segment of the lens from the inner edge of the near vision segment, and by providing a method wherein a near vision segment blank is formed with a front curve and a central opening therein, in which a distant vision portion is formed thereover to create a composite blank, from which a finished lens may be made by forming a front lens curve and a rear lens curve such that the center of curvature of the bifocal segment front surface will be on a line extending from the center of curvature of the rear lens surface to the inner surface of the bifocal segment.

The manner in which these objects, and other objects and advantages inherent in the invention are accomplished will become more clearly apparent when reference is made to the following detailed description of the preferred embodiments of the invention, and to the accompanying drawings in which like reference numerals represent corresponding parts throughout.

BRIEF DESCRIPTION OF THE DRAWINGS

FIG. 1 is a front elevational view of one form of contact lens embodying the invention;

FIG. 2 is a vertical sectional view, of the lens unit of FIG. 1, taken along lines 2—2 thereof;

FIG. 3 is a front elevational view of another form of lens unit made according to the invention;

FIG. 4 is a vertical sectional view of the lens of FIG. 3, taken along lines 4—4 thereof;

DESCRIPTION OF THE PREFERRED EMBODIMENTS OF THE INVENTION

Figure 5:
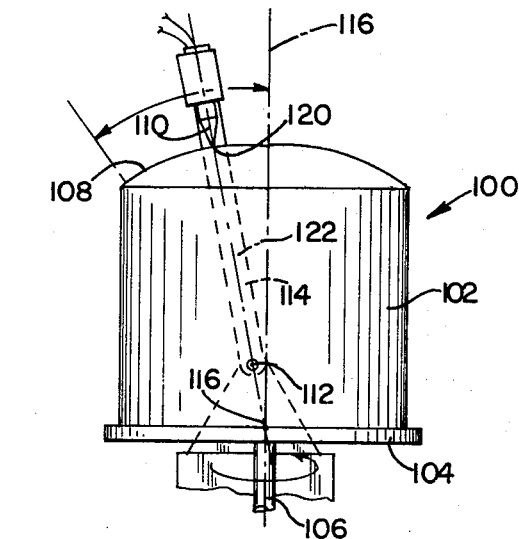
FIG. 5 is a view of a near vision segment blank being formed according to the invention.

Although the principles of the present invention are applicable to a variety of optical devices, the invention will be described with reference to a bifocal contact lens constructed of a transparent plastic material and being adapted to be worn over the cornea of the eye of the wearer. As used herein, and in the claims, it will be understood that expressions such as "front", "rear", "top", "bottom", or other like words implying direction or orientation, are intended to apply to the orientation that such units would have when in position of use over the eyes of a person, it being further understood that the lenses are useful in composition, and that a person wearing the lens might have his head and eyes in any one of a number of positions from time to time.

Referring now to the drawings in greater detail, FIG. 1 and 2 show one embodiment of a contact lens unit 20 having a front surface portion 22 and a rear surface portion 24 defining therebetween a solid lens body 26 having a centrally disposed, distant vision segment 28 and a near vision segment 30 of generally annular form therein. The near vision segment 30 is separated from the far vision zone 28 of the lens 20 along a generally annular, inner surface portion 32 of the bifocal segment 30 and is further defined in part by a front bifocal segment surface 34 and a rear bifocal segment surface 36 which forms a portion of the continuous, smooth so-called base curve making up the rear surface 24 of the lens unit. The front surface 34 and the rear surface 36 of the bifocal segment 30 meet along an outer bifocal segment line 38 lying on the rear surface 24 of the lens 20. Although the outer segment line 38 is spaced apart from the outer edge 40 of the lens 20 by a margin 42 of the same material comprising the principal lens body or element 26 and the far vision zone 28, in use, the eye is never positioned relative to the lens such that the center of vision thereof lies within the margin 42, and accordingly, the optical characteristics of this margin are not important. Nevertheless, since this part of the lens can be made from a low index of refraction, stable plastic material, the overall dimensional stability of the lens is greatly enhanced.

Referring now in particular to FIG. 2, it will be noted that the inner surface portion 32 of the bifocal segment 30 meets the front bifocal segment surface 34 along a segment line 46. Although, properly considered, the inner surface of the annular or toroidal bifocal segment 30 of this embodiment is defined by two segment lines 44, 46 and the surface portion 32 extending therebetween, the expression "segment line" is sometimes applied to the surface 32 and the lines 44, 46 defining such surface, it being understood that the width of the surface 32 is so small that it may appear to be only a line, and, for practical purposes, may be regarded as such.

Furthermore, the shape of the inner surface portion 32 may be truly cylindrical, or may be in the form of a frustum of a cone, as will be appreciated by the fact that, strictly speaking, a surface entending from the center of curvature of the rear surface 24 of the lens and defining an opening therein of any significant size would be conical in shape. However, in view of typical dimensions of lenses of the type under consideration, it may be said that this surface 32 is, for practical purposes, cylindrical.

Furthermore, being of only very slight axial extent, as pointed out above, and because when viewed in elevation, it appears to be circular, it may sometimes be referred to as circular rather than as having a three dimensional form of circular cross-section.

By reference to FIG. 2, it will also be noted that an imaginary center line 48 extends through the center of the far vision zone 28, and that the center of curvature 50 of the rear lens surface 24 lies thereon. In the illustrated embodiment, the center of curvature 52 of the front surface 22 of the lens 20 also lies on this line. However, as will be brought out further herein, and as is well known in the art, this center of curvature 52 may lie axially either in front of or behind the center of curvature 50, or coincidently therewith. Moreover, it is known to be common for the center of curvature 52 to lie somewhat radially outwardly from the center line 48, to render one portion of the lens heavier than another to provide orientation thereof in use, particularly where the visual condition to be corrected by the lens differs in relation to different meridians of the eye. On the other hand, such orientation may be accomplished by disposing a dense metal weight within the lens, such as at the interface between the bifocal segment 30 and the body 26 of the lens, as described and claimed in U.S. Pat. No. 3,431,327.

Referring now to a very important feature of the invention, it will be noted that the front surface 34 of the bifocal segment 30 has a center of curvature 54 which lies on a straight line 56 extending between the radially inner surface portion 32 of the segment 30 and the center of curvature 50 of the rear surface 24 of the lens 20.

As a result of this feature, two definite advantages are provided in the present invention. By locating the center of curvature 54 on line 56, no jump occurs as the eye moves so that the line of sight crosses the "segment line", that is, the lines 44, 46 and the surface 32 defined thereby.

In addition, the bifocal segment may be made much thinner, since greater power may be provided with less overall thickness of the segment 30, and therefore the lens may be made more stable dimensionally. In other words, a greater relative difference in curvature between surface 24 and 34 may be accomplished for the same thickness and radial extent of segment 30 than may be accomplished if the center of curvature 54 were to lie on the center line 48, for example. Thus, a bifocal segment should provide the necessary power resulting from difference in these curvatures, but the segment must also be of a radial extent sufficient so that the center of vision will fall therein during any amount of movement is it reasonably anticipated that the eye will make while the center thereof is in the near vision zone. Bifocal contact lenses formed as illustrated in FIGS. 1 and 2 have been found to be free from the objectionable "jump" phenomenon and can be made with the bifocal segments thereof having much thinner cross-sections than has heretofore been possible.

Referring now in particular to FIGS. 3 and 4, another form of the invention is shown. FIG. 3 shows a lens 20a which is similar to lens 20 of FIGS. 1 and 2, differing therefrom only in the construction of the bifocal segment 30a. As can be noted by reference to FIGS. 3 and 4, a lens body 26a defined by front and rear curved surfaces 22a, 24a is shown, with a center portion 28a provided therein for distant viewing. As in the earlier described embodiment, the center of curvature 50a lies along an imaginary line 48a passing through the center of the far vision segment 28a, while the center of curvature 54a of the front surface portion 34a of the bifocal segment 30a lies along a straight line 56a extending from center of curvature 50a to the surface 32a defined by segment lines 44a, 46a.

An outer segment line 38a extends around the outer edge of the bifocal segment 30a, spaced inwardly from the lens edge 40a by the margin 42a. By particular reference to FIG. 3, however, it will be noted that surface 32a is in the form of only a portion of complete ring or annulus, and since the outer segment line 38a is also in the form of only a portion of a circle, the bifocal segment 30a itself is in the form of a part of a ring of toroid. A pair of generally radially extending, somewhat arcuate surfaces 58, 60 extend between the ends 62, 64 of the surface 32a outwardly toward and terminate in the corners or edges 66, 68 of segment line 38a. Accordingly, the bifocal segment is defined by inner surface 32a, by a pair of surfaces 58, 60 of curvilinear form but larger radius than the other surface 32a defining the radially inner parts thereof, as well as being defined at its outer edge by the segment line 38a formed where segment 30a joins the rear surface 24a of the lens 20a.

By reason of the placement of the center of curvature 54a in relation to the straight line 56a extending between the center of curvature 50a of the rear surface 24a and the inner segment surface 32a, no jump characteristics are provided at all points of the segment lines and surfaces 44a, 46a, and 32a. Since there is no bifocal segment above surfaces 58, 60, jump is obviously likewise not experienced if the eye moves upwardly from the center of the lens and radially outwardly.

A lens of the type shown in FIGS. 3 and 4 is of great utility for those who wish to have a large area distant vision segment 70 in addition to the distant vision segment provided by the partially circular region 28a, but who also wish to have a substantial bifocal segment across which the center of vision of an eye may pass, particularly laterally, without experiencing jump. In reference to FIG. 3, it will be noted that one preferred form of the invention shows that surfaces 58, 60 are curvilinear; it will be understood, however, that these surfaces might be of a somewhat different form.

Lenses made in the form shown in FIG. 3 are particularly advantageous to workers who wish to have a large single vision or far vision segment, but whose eye movements are customarily largely lateral within the near vision sight zone or area. Thus, for example, typists commonly read from material positioned to the right or left of the typewriter and scan the material from left to right with occasional or frequent glances to the straight ahead position of the typewriter, all while looking somewhat downwardly.

Since all of this viewing is desired to be done through the near vision segment, it is necessary that the bifocal segment have considerable lateral extent, and at the same time, entry from the distant vision zone to the near vision zone should always desirably be across a surface or line wherein there is no jump. Lenses such as those shown in FIG. 3 are the only known type which will provide a combination of all these advantageous features, particularly in a dimensionally stable lens which is easy to manufacture.

In the past, it was not believed possible to provide a fused bifocal contact lens in which there was no jump at any part of the segment line or surface separating the near vision zone from the far vision zone, and only a few lenses have been provided in which there was no jump at only a single point on the segment line. In addition, in lenses wherein the principal body of the lens was manufactured from a high index of refraction material and the bifocal segment was made from a lower index material, the resulting lens was inherently unstable dimensionally by reason of this fact. Furthermore, certain prior art lenses were difficult to make by techniques similar or analogous to those normally used in making fused contact lenses.

Accordingly, as pointed out above, an object of the present invention is to provide a method of making a lens which is practical from a production standpoint, and a method of making a blank from which such lenses can subsequently be readily made. This method is illustrated in FIGS. 5-9. Thus, referring now to FIG. 5, there is illustrated a bifocal segment blank 100 comprising a body 102 of a transparent, high index of refraction plastic material, such as an acrylic plastic or the like, held on a rotatable mount 104 able to be turned by a shaft 106. A front curve 108 is imparted to the body 102 by swinging a cutting tool 110 through an arc as shown by the arrows in FIG. 5, about a point 112, by mounting the tool 110 on a lever arm 114. Thus, having in mind the desired radius of curvature to be formed on the front surface 108 of the blank 100, and knowing the desired radius of curvature of the rear surface of the lens ultimately to be formed from the blank, and also knowing the desired diameter of the central portion of far vision zone, it will be possible to determine the point 118 which will form the center of curvature of the rear surface of the lens, and in addition thereto, the radial offset of point 112 will be predetermined, since this point will fall on a straight line from point 118 to a point designated 120 which represents the ultimate diameter of the opening in the blank 100. Thus, point 112 is spaced inwardly from point 120 a distance equal to the radius of curvature of surface 108, and is offset from the imaginary center line 116 an amount determined by the angle of the line 122 extending from the proposed center of curvature 118 of the rear surface to be formed and point 120 on surface 108. Obviously, point 120 will lie on the surface defining the radially inner edge of the bifocal segment.

After such front surface 108 has been formed and polished according to the criteria set forth above, such cutting and polishing per se being carried out in a known manner, a tool 124 having cutting edges 126, 128 is used to form an opening 130 defined by a continuous annular side wall 132, terminating at point 120.

Figure 7:
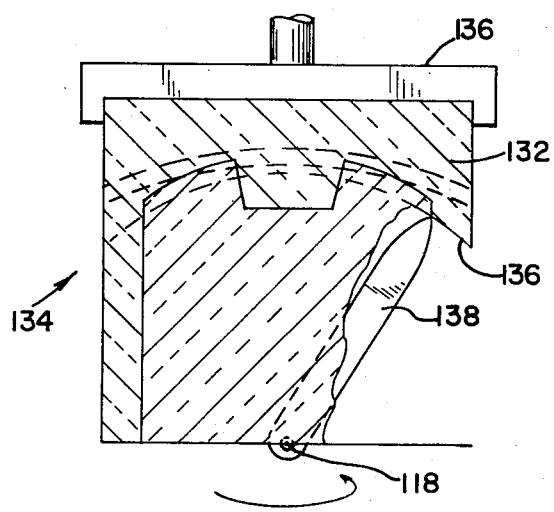
FIG. 7 shows the formation of a composite blank and the manner of forming a portion of the base curve thereof.

Thereafter, as shown in FIG. 7, a mass 132 of a transparent optical material having a lower index of refraction is cast or otherwise formed over surface 108 and filling opening 130, to form a composite blank 134. This material is also typically an acrylic plastic, differing from the plastic forming body 102 only in chemical or physical characteristics, particularly its index of refraction. This blank 134 is then held in a collet 136 for rotation about its central axis, since a rough base curve 136, that is, the curve of the radius which will form the rear surface of the finished lens is formed using predetermined point 118 as the center thereof. In FIG. 7, tool 138 is illustrated as performing this function.

Figure 8:
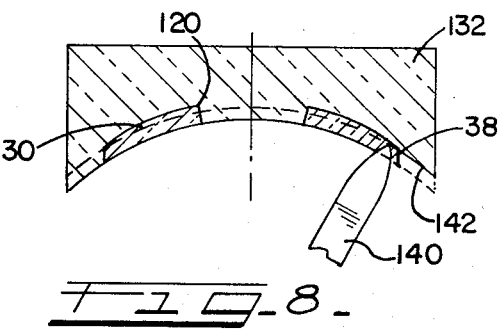
FIG. 8 shows the formation of the finished rear or base curve of the lens using the previously formed near vision segment blank as a part thereof.

Referring now to FIG. 8 it will be seen that a final cut is made by a cutting or polishing tool somewhat diagrammatically shown at 140, so as to establish a final curvature 142 on the rear surface of the lens. Feeding of the composite blank axially of the center line 116 is stopped when the outer segment line 38 (or 38a), lies outwardly of point 120 by a distance equal to the desired radial extent or width of the bifocal segment 30 being thus formed. In this connection, it will be noted that the width or diameter of blank 100 is significantly greater than the intended final diameter of the entire bifocal segment 34. Thus, a blank having the rear surface finished in this manner will have the front curve of the bifocal segment established and the rear or base curve of the entire lens formed according to the prescription desired. The bifocal segment will then be of the proper width, and the opening defined for distant vision will have been determined by the diameter of the opening 130, therefore, the only remaining step is a step such as that shown in FIG. 9, wherein a cutting tool is used to cut the ultimate contour of the front surface 144 of the finished lens. If it is desired to make the lens of the shape shown in FIG. 9, for purposes of having one portion thereof heavier than a diametrically opposite portion, the center of curvature 146 of the front surface 144 is offset from the center line 116 as shown.

Figure 6:
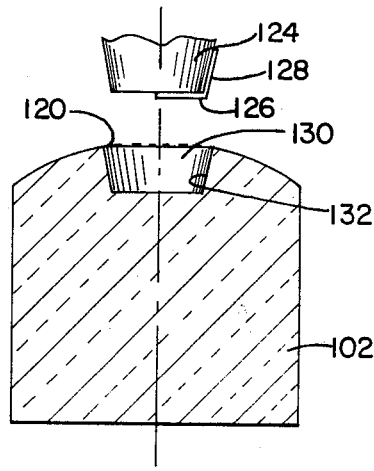
FIG. 6 shows the blank of FIG. 5 with the front curve formed thereon and with a central opening formed therein.
Figure 9:
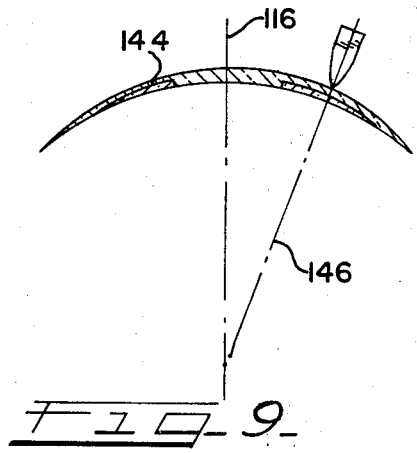
FIG. 9 shows one method of forming the front curve of the finished lens from the composite blank.

Manufacturing a bifocal lens of the type shown in FIG. 3 is carried out in the same manner as just described, except that, after completion of the step shown in FIG. 6, the body 102 of the bifocal blank 100 is cut so that, when viewed from the front, it will have the profile of the bifocal segment 30a shown in FIG. 3, for example. Thus, with the segment being in the form of a partially cylindrical section with a partially circular central opening therein, the far vision portion is cast and manufacture of the lens is thereafter carried out as shown in FIGS. 7, 8 and 9. Thus, the method illustrated in FIGS. 5-9 is applicable to lenses in which the bifocal segment is ultimately of the form of a complete ring or toroid, or of the form of only a portion of a ring or toroid.

In reference to the method just described, it will be noted that one advantage of the method is the fact that the curves cut in the lens are surfaces of revolution having simple forms. It is not necessary, in order to obtain the no-jump feature and other advantages of the invention, to provide compound curves which are difficult to form and which, if lying on a front surface of the lens, would be further disadvantageous.

It will thus be seen that the present invention provides a new bifocal contact lens, lens blank, and method having a number of advantages and characteristics including those pointed out herein and others which are inherent in the invention.

I claim:

1. A bifocal contact lens unit having a generally convex front lens surface portion and a generally concave rear lens surface portion and including a distant vision portion and a bifocal segment portion fused in place within said lens unit and partially defined by a segment front surface portion having a given radius of curvature and a plurality of centers of radial curvature, and an at least partially annular, generally axially extending, generally radially inwardly facing inner segment surface portion meeting said rear lens surface along a given line and meeting said segment front surface along a segment line, each of said centers of radial curvature lying on a given sight line between a center of curvature of said rear lens surface portion and the point on said segment line intersected by said given sight line, whereby said lens is characterized by the absence of image displacement when the sight line of a user crosses any portion of said radially inner surface of said bifocal segment at any point along said inner segment surface portion.

2. A lens unit as defined in claim 1 in which said at least partially annular inner segment surface portion is completely annular, said bifocal segment being fully annular and totally surrounding said distant vision portion of said lens.

3. A lens unit as defined in claim 1 in which said partially annular inner segment surface portion extends through an arc of about one-half of a circle, said bifocal segment having edge surfaces extending radially outwardly from the ends of said inner surface portion and occupying about one-half of said complete lens unit when viewed from the front.

4. A lens unit as defined in claim 1 in which said given radius of curvature of said segment front surface portion is a constant radius of curvature.

5. A lens as defined in claim 1 wherein said center of curvature of said rear lens surface portion is a single center of curvature.

6. A lens as defined in claim 1 in which said lens front surface portion has a center of curvature lying at a point offset from a sight line extending from said rear lens surface center of curvature to the center of said lens unit.

7. A lens as defined in claim 1 in which said bifocal segment is further defined by a radially outer edge portion lying generally parallel to the outer edge of said lens, wherein said segment line occupies about one-half of a circle, wherein said radially outer edge portion of said bifocal segment subtends a greater angle than said segment line, and wherein generally radially disposed segment lines extend between respective outer ends of said segment line and said outer edge portions.

* * * * *